US010855125B2

(12) United States Patent
Yen et al.

(10) Patent No.: US 10,855,125 B2
(45) Date of Patent: Dec. 1, 2020

(54) ROTOR, MOTOR AND ELECTRICAL DEVICE INCLUDING THE MOTOR

(71) Applicant: Nidec Corporation, Kyoto (JP)

(72) Inventors: Sheng-Chan Yen, Taipei (TW); Hsin-Nan Lin, Taipei (TW); Yu-Wei Hsu, Taipei (TW); Cheng-Tsung Liu, Kaohsiung (TW)

(73) Assignee: NIDEC CORPORATION, Kyoto (JP)

( * ) Notice: Subject to any disclaimer, the term of this patent is extended or adjusted under 35 U.S.C. 154(b) by 117 days.

(21) Appl. No.: 16/142,070

(22) Filed: Sep. 26, 2018

(65) Prior Publication Data
US 2019/0165623 A1 May 30, 2019

(30) Foreign Application Priority Data
Nov. 30, 2017 (CN) .......................... 2017 1 1239739

(51) Int. Cl.
*H02K 1/24* (2006.01)
*H02K 1/16* (2006.01)
*H02K 29/03* (2006.01)
*H02K 19/10* (2006.01)

(52) U.S. Cl.
CPC ............ *H02K 1/246* (2013.01); *H02K 1/165* (2013.01); *H02K 19/103* (2013.01); *H02K 29/03* (2013.01)

(58) Field of Classification Search
CPC ...... H02K 1/246; H02K 1/165; H02K 19/103; H02K 19/10; H02K 29/03; H02K 2213/03
See application file for complete search history.

(56) References Cited

U.S. PATENT DOCUMENTS

| 6,759,780 | B2* | 7/2004 | Liu | H02K 3/28 |
| | | | | 29/596 |
| 7,358,638 | B2* | 4/2008 | Miyashita | H02K 29/03 |
| | | | | 310/156.53 |
| 9,831,729 | B2* | 11/2017 | Kim | H02K 1/276 |
| 10,256,708 | B2* | 4/2019 | Papini | H02K 21/14 |
| 10,305,336 | B2* | 5/2019 | Lange | H02K 1/2766 |
| 10,389,193 | B2* | 8/2019 | Ito | H02K 29/03 |
| 2010/0026128 | A1* | 2/2010 | Ionel | H02K 1/2766 |
| | | | | 310/156.53 |
| 2012/0062053 | A1* | 3/2012 | Moghaddam | H02K 1/246 |
| | | | | 310/46 |
| 2013/0069470 | A1* | 3/2013 | Jurkovic | H02K 1/276 |
| | | | | 310/156.53 |

(Continued)

FOREIGN PATENT DOCUMENTS

CN 104221261 A 12/2014
CN 105914925 A 8/2016
(Continued)

*Primary Examiner* — Edgardo San Martin
(74) *Attorney, Agent, or Firm* — Keating & Bennett (57) ABSTRACT

A motor includes a stator including wound multiphase coils and stator slots that accommodate the multiphase coils, and a rotor provided at an inner side of the stator. Poles are provided in a direction of rotation, and sets of flux barriers are provided on the rotor, each of the poles respectively corresponding to a set of the flux barriers. A ratio between a total number of the stator slots and a product of a total number of poles of the rotor and a phase number of the multiphase coils is a non-integer. With the structure of the motor, a torque ripple is reduced while an output torque is kept unchanged.

7 Claims, 6 Drawing Sheets

(56) References Cited

U.S. PATENT DOCUMENTS

2015/0091406 A1* 4/2015 Tajima .................. H02K 21/16
                                                      310/156.38
2019/0068036 A1* 2/2019 Mazza .................. H02K 1/246

FOREIGN PATENT DOCUMENTS

| CN | 107181337 A | 9/2017 | |
|---|---|---|---|
| WO | WO-2015120959 A1 * | 8/2015 | ........... H02K 1/2766 |
| WO | WO-2018002128 A1 * | 1/2018 | ............. H02K 1/246 |
| WO | WO-2018188755 A1 * | 10/2018 | ........... H02K 1/2766 |
| WO | WO-2019052828 A1 * | 3/2019 | ............. H02K 29/03 |

\* cited by examiner

ROTOR, MOTOR AND ELECTRICAL DEVICE INCLUDING THE MOTOR

CROSS REFERENCE TO RELATED APPLICATIONS

This application claims the benefit of priority to Chinese Patent Application No. 201711239739.8 filed on Nov. 30, 2017. The entire contents of this application are hereby incorporated herein by reference.

BACKGROUND OF THE INVENTION

1. Field of the Invention

The present invention relates to motors and, particularly to a rotor, a motor, and an electrical device including the motor.

2. Description of the Related Art

In a conventional motor, in order to reduce torque ripples, rotors deflect radially. For a synchronous reluctance motor, different rotor structures are stacked to reduce torque ripples and keep an output torque unchanged.

Figure 1:
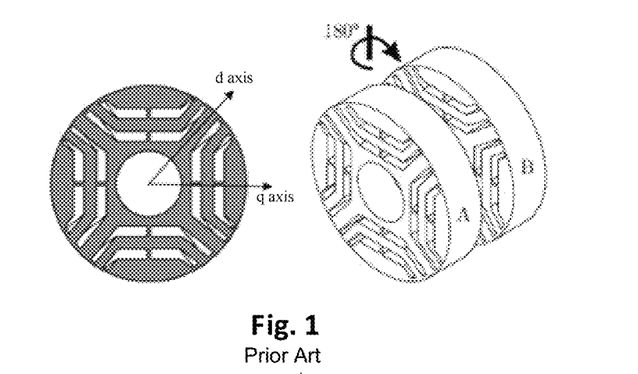
FIG. 1 is a sectional diagram and an exploded diagram of a conventional rotor stacked by different flux barrier structures.

FIG. 1 is a sectional view and an exploded view of a rotor stacked by different flux barrier structures. As shown in FIG. 1, the whole rotor is formed by stacking two rotors having different flux barrier structures, i.e., rotor A and rotor B. A main difference between rotor A and rotor B lies in that flux barrier structures in a direction of q axis are identical, but flux barrier structures in a direction of d axis are different with respect to an angle of a stator slot. The q axis here refers to a line extending from a center of a rotor to a direction with the maximum reluctance, and the d axis refers to a line extending from the center of the rotor to a direction with the minimum reluctance. Due to different flux barrier structures, torque ripples generated respectively by these two rotors are different such that a wave peak and a wave trough of their respective torque waveforms can differ by 180°. Namely, a wave peak of the rotor A just opposes a wave trough of the rotor B, and a wave peak of the rotor B opposes a wave trough of the rotor A. Through such a design, two rotors are stacked such that two kinds of torque ripples are synthesized into a new torque waveform and sizes of a wave peak and a wave trough of the synthesized torque waveform can be reduced so as to achieve the purposes of reducing torque ripples and maintaining an average output torque.

Figure 2:
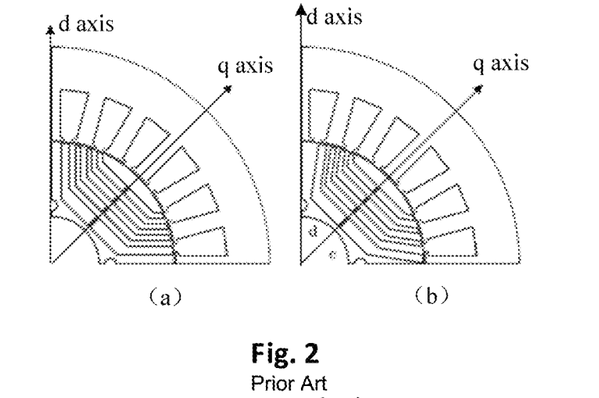
FIG. 2 is a schematic diagram of a partial cross section of a conventional 24-slot stator matched with symmetric and asymmetric rotors.
Figure 3:
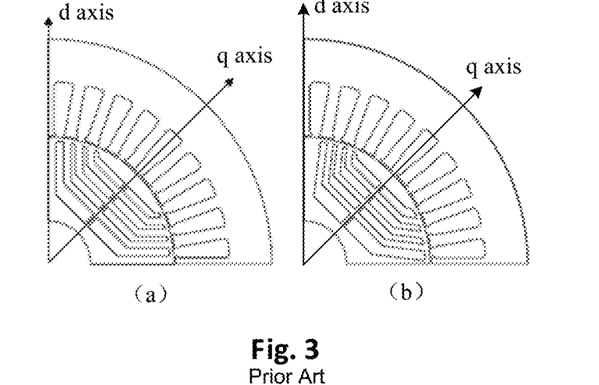
FIG. 3 is a schematic diagram of a partial cross section of a conventional 36-slot stator matched with symmetric and asymmetric rotors.

FIG. 2 is a schematic diagram of a partial cross section of a 24-slot stator, matched with symmetric and asymmetric rotors and FIG. 3 is a schematic diagram of a partial cross section of a 36-slot stator matched with symmetric and asymmetric rotors. As shown in FIGS. 2 and 3, the left side (a) is a rotor with a symmetric flux barrier, referred to as a symmetric rotor, and the right side (b) is a rotor with an asymmetric flux barrier, referred to as an asymmetric rotor. Generally, the structure of a rotor of a synchronous reluctance motor is a symmetric structure, regardless of using the d axis or q axis as a central line, and a flux barrier structures inside a rotor can mirror with each other. And for symmetric rotor structures, regardless of whether a direction of rotation is clockwise or anticlockwise, motor properties are the same. An asymmetric rotor structure is not mirrored using any axial direction (q axis or d axis) as a central line. By taking the right side of FIG. 2 as an example, assuming that the q axis is used as a central line, flux barrier structures at its two sides cannot mirror each other such that flux barriers are different with respect to the angles of the stator slots. However, through designing, an asymmetric rotor structure may also reduce torque ripples in the case that an output torque remains unchanged.

For an asymmetric rotor structure, the manner of reducing torque ripples corresponding to a rotor stacked by different flux barrier structures, is similarly a method for synthesizing two kinds of waveforms into a new torque waveform. Further, by taking the asymmetric rotor structure shown on the right side of FIG. 2 as an example, assuming that the q axis is taken as a central line, flux barrier structure at its two sides are respectively referred to as rotor c and rotor d. After mirroring, rotor c and rotor d become asymmetric rotors and their torque waveform can be respectively obtained. An angle of the flux barrier of the rotor c relative to a stator slot is far away from the central line q axis. Further, an angle of the flux barrier of the rotor d relative to a stator slot is close to the central line q axis. Therefore, when designing flux barriers of the c rotor and d rotor, a wave peak and a wave trough of a torque waveform of the rotor c and the rotor d differ by 180°. When these two rotor structures are together, sizes of a wave peak and a wave trough of a torque waveform can be reduced such that a torque ripple is reduced.

It should be noted that the above introduction to the Background is just to facilitate a clear and complete description of the technical solutions provided by preferred embodiments of the present invention, and is elaborated to facilitate the understanding of persons skilled in the art. It cannot be considered that the above technical solutions are known by persons skilled in the art just because these solutions are elaborated in the Background.

SUMMARY OF THE INVENTION

The inventors of preferred embodiments of the present invention discovered that a shape and a position of a flux barrier causes a reluctance in an air gap to have discontinuous or dramatic changes, such that a component of multiple harmonics may be generated spatially. The greater a harmonic component is, the more a torque ripple is increased. Increased torque ripple causes a motor to generate increased noise and heat energy, which affects the stability of a torque output and difficulty in designing a control algorithm. Torque ripple can be reduced by changing a structure of a stator slot or by an inclined rotor structure change. However, changing a structure of a stator slot or an inclination of the rotor structure also reduces an output torque, and the ways in which a shape change may adjust an amplitude of a structure of a stator slot and a rotor inclination angle are very limited such that an overall proportion of reducing a torque ripple also is limited and a torque ripple cannot be reduced significantly.

Preferred embodiments of the present invention provide a rotor, a motor, and an electrical device including the motor, with which it is possible to reduce a torque ripple while an output torque is kept unchanged.

According to a first aspect of a preferred embodiment of the present disclosure, a motor is provided, including: a stator including wound multiphase coils and stator slots that accommodate the multiphase coils, and a rotor provided at an inner side of the stator, poles being provided in a direction of rotation, sets of flux barriers being provided on the rotor, each of the poles respectively corresponding to one of the sets of flux barriers. A ratio between a total number of the stator slots and a product of a total number of poles of the rotor and a phase number of the multiphase coils is a non-integer.

In a preferred embodiment of the present invention, in a set of flux barriers corresponding to each pole, included angles between lines from two points on a circumferential edge of at least one flux barrier with respect to the center of the rotor and the central line are unequal by taking a line extending from the center of the rotor to a direction with the maximum reluctance as a central line.

In a preferred embodiment of the present invention, in a set of flux barriers corresponding to each pole, widths of circumferential edges of at least one flux barrier in a circumferential direction are unequal by taking a line extending from the center of the rotor to a direction with the maximum reluctance as a central line.

In a preferred embodiment of the present invention, the number of stator slots is 18, 27, 30, 42, or 45.

In a preferred embodiment of the present invention, the number of poles is 2, 4, or 6.

In a preferred embodiment of the present invention, the numbers of the stator slots corresponding to two adjacent poles are unequal, and the numbers of the stator slots corresponding to every two nonadjacent poles with a pole spaced therebetween are the same.

In a preferred embodiment of the present invention, the numbers of the stator slots occupied by coils of each phase in two adjacent poles are different, but the numbers of the stator slots occupied in every two nonadjacent poles with a pole spaced therebetween are the same.

In a preferred embodiment of the present invention, the plurality of sets of flux barriers are provided at an equal spacing in a circumferential direction.

According to a second aspect of a preferred embodiment of the present disclosure, a rotor is provided, a plurality of poles are provided in a direction of rotation of the rotor, sets of flux barriers are provided on the rotor, each pole corresponding to a set of flux barriers. In respective ones of the sets of flux barriers corresponding to each pole, included angles between lines from two points on a circumferential edge of at least one flux barrier respectively to the center of the rotor and the central line are unequal by taking a line extending from the center of the rotor to a direction with the maximum reluctance as a central line. Also or conversely, in respective ones of the sets of flux barriers corresponding to each pole, widths of circumferential edges of at least one flux barrier in a circumferential direction are unequal by taking a line extending from the center of the rotor to a direction with the maximum reluctance as a central line.

According to a third aspect of a preferred embodiment of the present disclosure, an electrical device is provided, wherein, the electrical device includes the motor according to the above first aspect.

An advantageous effect of the preferred embodiments of the present disclosure is that, with the structure of the motors of the preferred embodiments of the present disclosure, a torque ripple is able to be reduced significantly and the same output torque is able to be maintained such that the overall performance of the motor is improved.

Referring to the later description and figures, specific preferred embodiments of the present disclosure are disclosed in detail, indicating a manner in which the principles of the present disclosure are able to be adopted. It should be understood that the preferred embodiments of the present disclosure are not limited in terms of the scope. Within the scope of the terms of the appended claims, the preferred embodiments of the present disclosure include many changes, modifications and equivalents.

Features that are described and/or illustrated with respect to one preferred embodiment may be used in the same way or in a similar way in one or more other preferred embodiments and in combination with or instead of the features of the other preferred embodiments.

It should be emphasized that the term "comprise/include" when being used herein specifies the presence of features, integers or components, but does not preclude the presence or addition of one or more other features, integers or components.

The above and other elements, features, steps, characteristics and advantages of the present invention will become more apparent from the following detailed description of the preferred embodiments with reference to the attached drawings.

BRIEF DESCRIPTION OF THE DRAWINGS

Elements and features described in a figure or a preferred embodiment of the present preferred embodiments of the present disclosure can be combined with an element and a feature shown in one or more other figures or preferred embodiments. In addition, in the figures, similar numerals represent corresponding components in several figures, and can be used to indicate corresponding components used in more than one preferred embodiment.

The included figures are used to provide a further understanding of the preferred embodiments of the present disclosure, constitute a part of the Description, are used to illustrate the preferred embodiments of the present disclosure, and expound together with the text description the principle of the present disclosure. The figures in the following description are only some preferred embodiments of the present disclosure. Persons skilled in the art can also obtain other figures based on these figures under the premise that they do not pay inventive labor.

DETAILED DESCRIPTION OF THE PREFERRED EMBODIMENTS

Referring to the figures, through the following Description, the above and other features of the preferred embodiments of the present disclosure will become clear. The following Description and figures specifically disclose the specific preferred embodiments of the present disclosure, showing partial preferred embodiments which are able to adopt the principles of the present disclosure. It should be understood that the present disclosure is not limited to the described preferred embodiments, and includes all the modifications, variations and equivalents falling within the scope of the appended claims.

In the preferred embodiments of the present disclosure, the term "first" and "second", etc. are used to distinguish different elements in terms of appellation, but do not represent a spatial arrangement or time sequence, etc. of these elements, and these elements should not be limited by these terms. The term "and/or" includes any and all combinations of one or more of the associated listed terms. The terms "include", "comprise" and "have", etc. specify the presence of stated features, elements, members or components, but do not preclude the presence or addition of one or more other features, elements, members or components.

In the preferred embodiments of the present disclosure, the singular forms "a/an" and "the", etc. include plural forms, and should be understood broadly as "a kind of" or "a type of", but are not defined as the meaning of "one"; in addition, the term "the" should be understood to include both the singular forms and the plural forms, unless the context clearly indicates otherwise. In addition, the term "according to" should be understood as "at least partially according to . . . ", the term "based on . . . " should be understood as "at least partially based on . . . ", unless the context clearly indicates otherwise.

In the preferred embodiments of the present disclosure, for ease of description, a direction parallel to a direction extending along a shaft is referred to as "an axial direction", a radius direction taking the shaft as a center is referred to as "a radial direction", and a circumferential direction taking the shaft as a center is referred to as "a circumferential direction", however these are just for ease of description and do not limit orientations of the motor when the motor is used and manufactured.

The various preferred embodiments of the present disclosure will be described below with reference to the figures. These preferred embodiments are only exemplary and do not limit on the preferred embodiments of the present disclosure.

Preferred Embodiment 1

Figure 4:
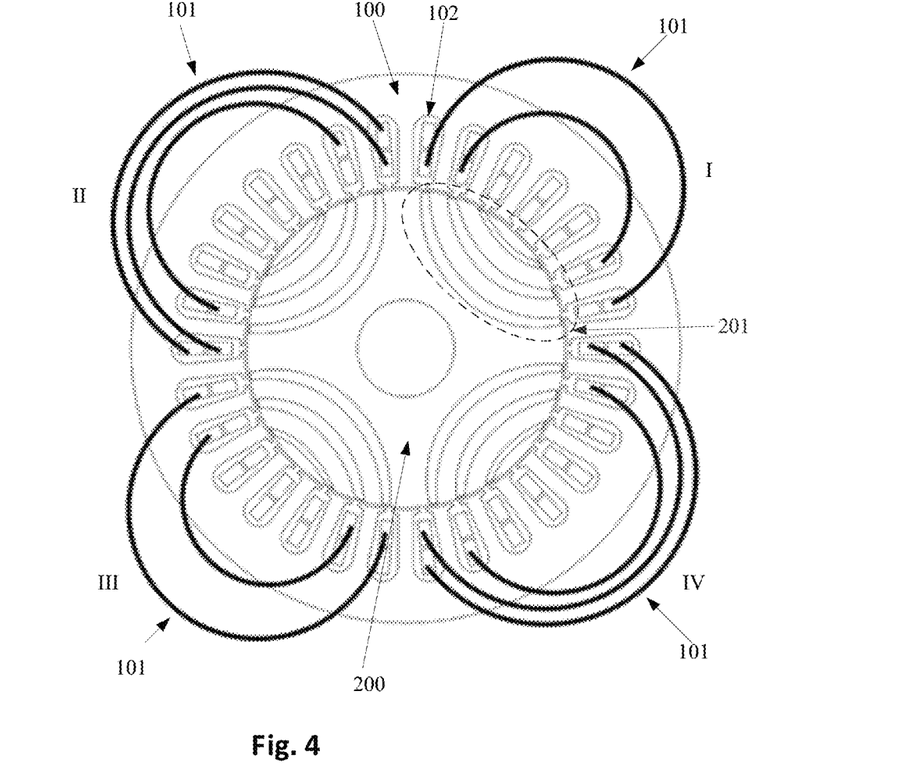
FIG. 4 is an axial plan view schematic diagram of the motor of a preferred embodiment of the present invention.

The present preferred embodiment of the present invention provides a motor. FIG. 4 is an axial plan view schematic diagram of the motor, and FIG. 5 is a stereoscopic schematic diagram of the motor.

Figure 5:
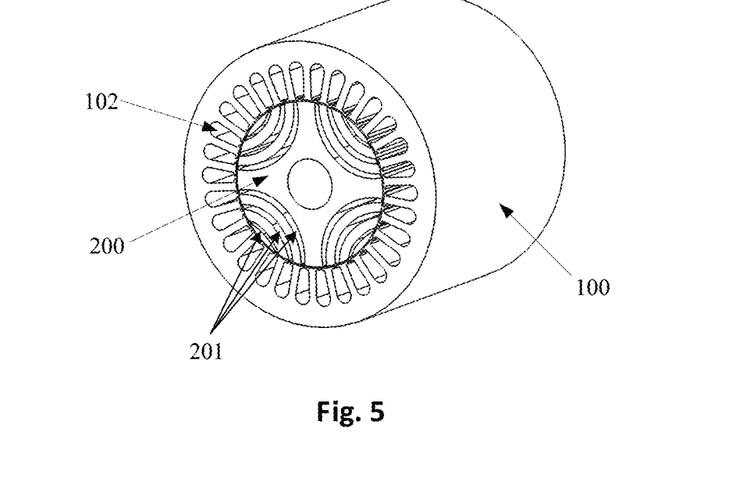
FIG. 5 is a stereoscopic schematic diagram of the motor of a preferred embodiment of the present invention.

As shown in FIGS. 4 and 5, the motor preferably includes: a stator 100 including wound multiphase coils 101 and stator slots 102 that accommodate the multiphase coils 101; and a rotor 200 provided at an inner side of the stator 100. A plurality of poles are provided in a direction of rotation, a plurality of sets of flux barriers 201 being provided on the rotor 200, each pole corresponding to a set of flux barriers.

In the illustrative examples of FIGS. 4 and 5, four poles (as shown by I, II, III, IV in FIG. 4) are provided in a direction of rotation of the rotor 200 such that four sets of flux barriers 201 are provided on the rotor 200. However, the present preferred embodiment is not limited to this, and the number of the poles and the number of sets of the flux barriers may also be others. For example, the number of the poles may be 2 or 6, correspondingly, the number of sets of the flux barriers may also be 2 or 6. In addition, in the illustrative examples of the preferred embodiments of the present invention shown in FIGS. 4 and 5, each set of the flux barriers 201 includes three flux barriers. In other illustrative examples of preferred embodiments of the present invention, each set of the flux barriers 201 may also have other quantities of flux barriers. Moreover, the present preferred embodiment does not limit methods for manufacturing the poles and the flux barriers.

In the present preferred embodiment, the motor includes the stator 100 and the rotor 200, and further includes other conventional motor components, such as a shaft and a circuit board, and for their structures and functions, related arts may be referenced, a description of them are omitted in the present preferred embodiment.

In the present preferred embodiment, a ratio ("a slot-pole ratio" for short) between the number of the above stator slots 102 and a product of the number of poles of the above rotor 200 and the phase number of the above multiphase coils 101 is preferably a non-integer. That is to say, S/(P×N) is preferably a non-integer, wherein S is the number of the stator slots 102, P is the number of poles of the rotor 200, and N is the phase number of the multiphase coils 101. With such a structure, a magnetic field action of a non-integer slot-pole ratio destroys a harmonic component of an air gap (a flux barrier) and reduces an overall torque ripple.

In the present preferred embodiment, besides using a non-integer slot-pole ratio to reduce a torque ripple, an asymmetric rotor design may be also adopted. The asymmetric rotor here refers to a rotor in which flux barriers are of an asymmetrical structure when taking a q axis as a center.

In one implementation of the present preferred embodiment, in a set of flux barriers corresponding to each pole, by taking a line extending from the center of the rotor to a direction with the maximum reluctance as a central line, the included angles between the lines from two points on a circumferential edge of at least one flux barrier respectively to the center of the rotor and the above central line are unequal, also namely edge angles are unequal.

Figure 6:
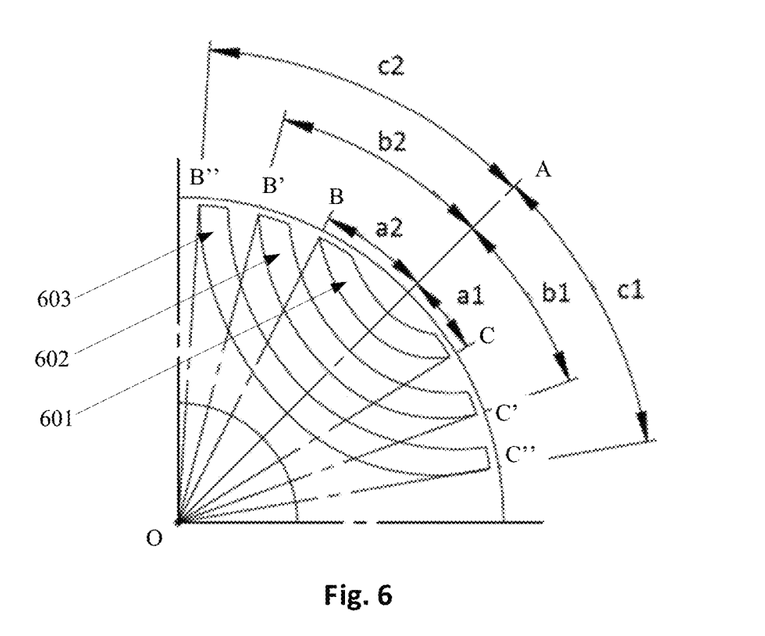
FIG. 6 is a partial schematic diagram of a rotor according to a preferred embodiment of the present invention.

By taking the number of poles being 4 and each flux barrier set having three flux barriers as an example, FIG. 6 shows a set of flux barriers corresponding to a pole of the rotor. As shown in FIG. 6, taking the line OA extending from the center O of the rotor to a direction with the maximum reluctance as a central line, the included angles a1 and a2 between the lines OB, OC from two points B, C on a circumferential edge of the flux barrier 601 respectively to the center O of the rotor and the central line OA are different (that is, a1≠a2). Similarly, the included angles b1 and b2 between the lines OB', OC' from two points B', C' on a circumferential edge of the flux barrier 602 respectively to the center O of the rotor and the central line OA may also be different (that is b1≠2). In addition, the included angles c1 and c2 between the lines OB", OC" from two points B", C" on a circumferential edge of the flux barrier 603 respectively to the center O of the rotor and the central line OA may also be different (that is c1≠c2). In other illustrative examples, for each set of flux barriers, it is possible that edge angles of only partial flux barriers are unequal.

In the present preferred embodiments of the present invention, through the design that edge angles of flux barriers are unequal, at least one flux barrier corresponding to each pole is preferably not present as a symmetric structure by taking q axis (the central line OA) as a center. This arrangement destroys an original interaction of magnetic fields of stator slots corresponding to flux barriers, further reduces higher harmonics in an air gap (a flux barrier) and reduces a torque ripple.

In one implementation of the present preferred embodiment, in a set of flux barriers corresponding to each pole, widths of circumferential edges of at least one flux barrier in a circumferential direction are unequal, also name edge widths are unequal by taking a line extending from the center of the rotor to a direction with the maximum reluctance as a central line.

Figure 7:
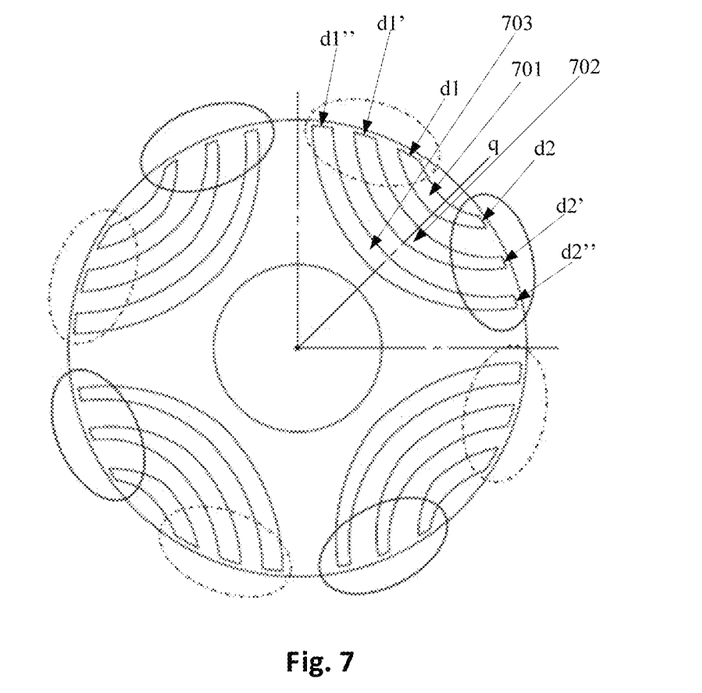
FIG. 7 is a schematic diagram of a rotor according to a preferred embodiment of the present invention.

When, for example, the number of poles is 4 and each flux barrier set has three flux barriers, FIG. 7 shows four sets of flux barriers corresponding to four poles of the rotor. As shown in FIG. 7, for each set of flux barriers, the dotted line portions and the solid line portions are different and the widths are unequal. In the illustrative example shown in FIG. 7, widths d1 and d2 of two circumferential edges of the flux barrier 701 in a circumferential direction are unequal, widths d1' and d2' of two circumferential edges of the flux barrier 702 in a circumferential direction are unequal, and widths d1" and d2" of two circumferential edges of the flux barrier 703 in a circumferential direction are unequal. In other illustrative examples, for each set of flux barriers, it is possible that edge widths of only partial flux barriers are unequal. In addition, in the illustrative example shown in FIG. 7, for each set of flux barriers, edge angles of three flux barriers are also unequal, also namely a1≠a2, b1≠b2, c1≠c2. However, as described above, the present preferred embodiment of the present invention is not limited to this.

In the present implementation of the present invention, through the edge widths of flux barriers being unequal, at least one flux barrier corresponding to each pole is not present a symmetric structure any longer by taking q axis (the central line OA) as a center. This arrangement destroys an original interaction of magnetic fields of stator slots corresponding to flux barriers and further reduces higher harmonics in an air gap (a flux barrier) and reduces a torque ripple.

In the present preferred embodiment, through the structures of the non-integer slot-pole ratio and the asymmetric rotor, the characteristic of reducing output torques which is caused by the original separate design is able to be canceled each other, the same output torque is able to be maintained, and a torque ripple is able to be significantly reduced.

In the present preferred embodiment, as described above, the slot-pole ratio is a non-integer, the number of the poles may preferably be 2, 4 or 6, the phase number of the multiphase coils is preferably three, and the number of the stator slots may preferably be 18, 27, 30, 42 or 45.

Figure 8:
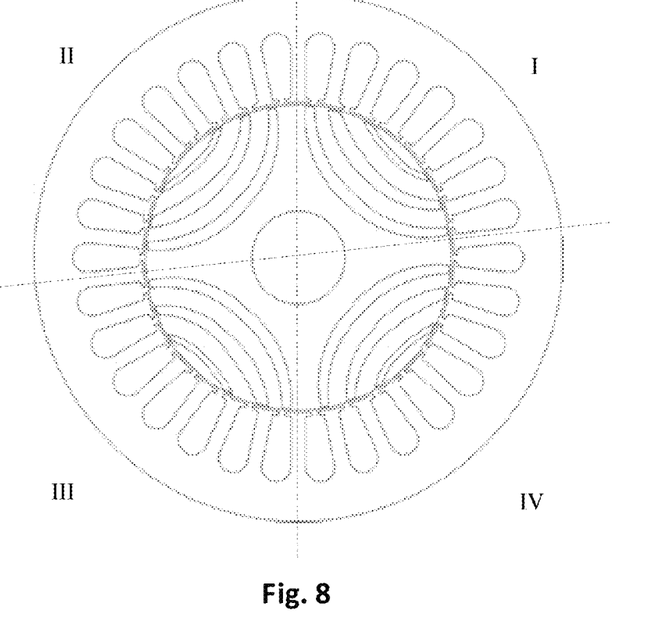
FIGS. 8-14 are schematic diagrams of motors according to different preferred embodiments of the present invention.
Figure 9:
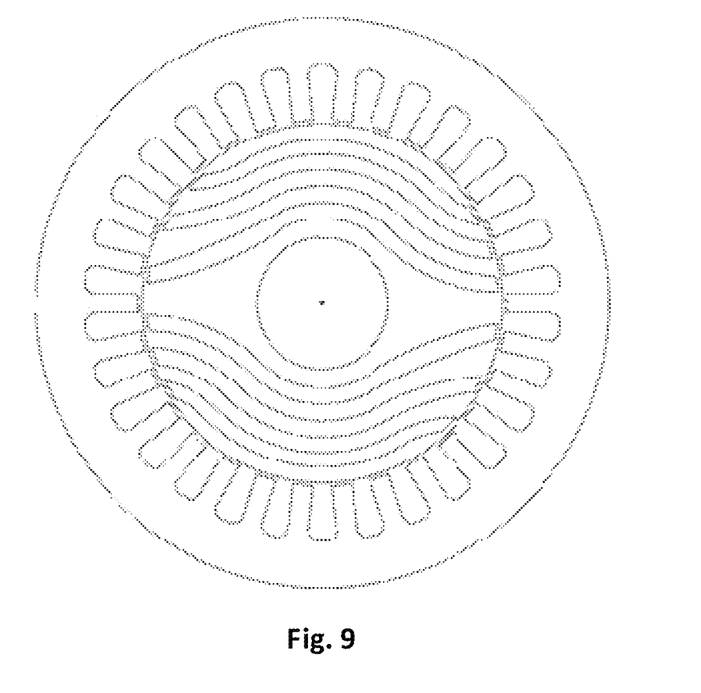
Figure 10:
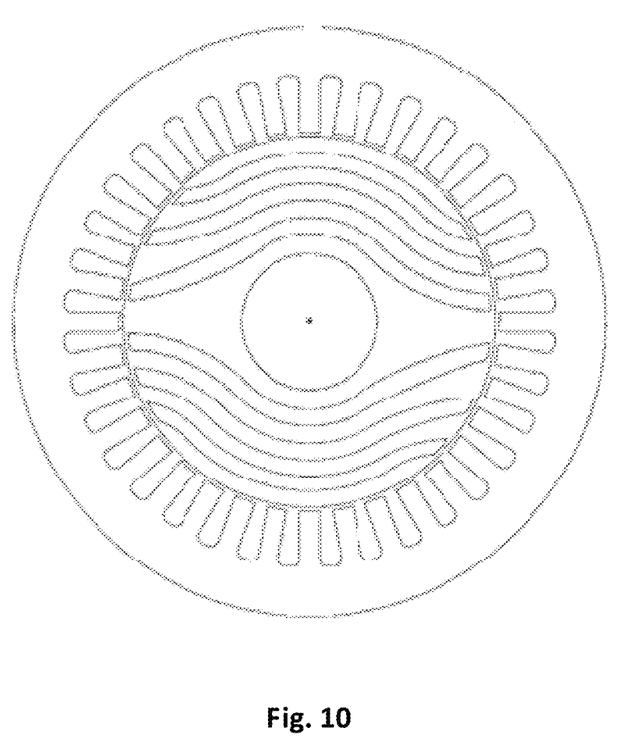
Figure 11:
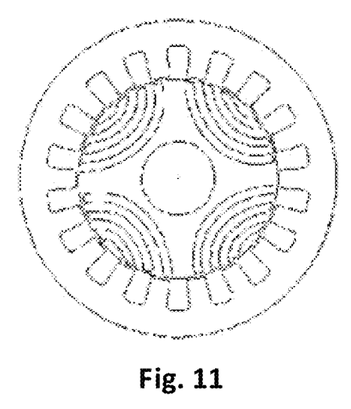
Figure 12:
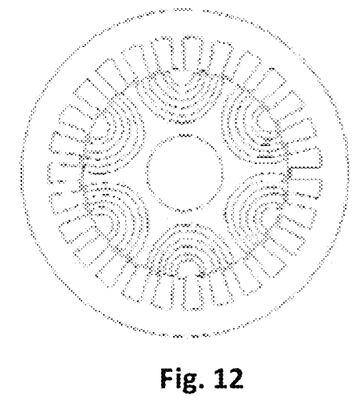
Figure 13:
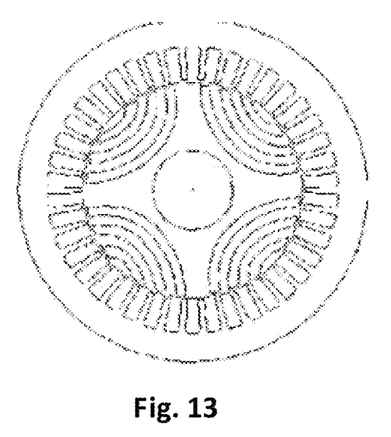
Figure 14:
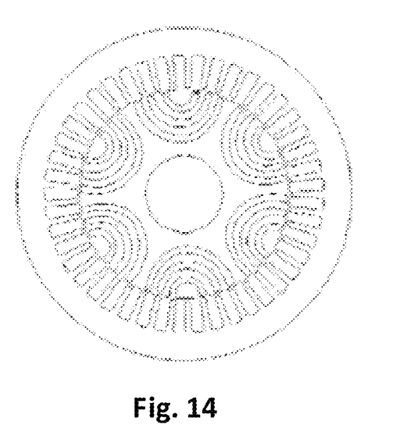

FIG. 8 shows an asymmetric structure of a 30-slot 4-pole 3-phase rotor, FIG. 9 shows an asymmetric structure of a 30-slot 2-pole 3-phase rotor, FIG. 10 shows an asymmetric structure of a 36-slot 2-pole 3-phase rotor, FIG. 11 shows an asymmetric structure of a 18-slot 4-pole 3-phase rotor, FIG. 12 shows an asymmetric structure of a 27-slot 6-pole 3-phase rotor, FIG. 13 shows an asymmetric structure of a 42-slot 4-pole 3-phase rotor, and FIG. 14 shows an asymmetric structure of a 45-slot 6-pole 3-phase rotor. Such asymmetric synchronous reluctance architectures of various preferred embodiments of the present invention with the number of stator slots matching with the number of poles not only is capable of reducing torque ripples, but also is capable of reducing a motor loss and a rated current, thus improving an output efficiency of a motor.

In one implementation of the present preferred embodiment, the numbers of the stator slots corresponding to two adjacent poles are preferably unequal, and the numbers of the stator slots corresponding to every two nonadjacent poles with a pole spaced there between are preferably the same. By taking the 30-slot 4-pole 3-phase rotor shown in FIG. 8 as an example, region I and region III correspond to seven stator slots respectively and region II and region IV correspond to eight stator slots respectively. With this arrangement, the quantities of the stator slots corresponding to adjacent poles such as region I and region II, or region II and region IIII, or region III and region IV, or region IV and region I are different. However, the quantities of the stator slots corresponding to every two nonadjacent poles with a pole spaced therebetween, such as region I and region III, or region II and region IV are the same.

That is to say, in the present implementation, the numbers of the stator slots occupied by coils of each phase in two adjacent poles are different, but the numbers of the stator slots occupied in every two nonadjacent poles with a pole spaced therebetween are the same. Accordingly, a balance of a magnetomotive force is able to be maintained.

In the present implementation, if the stator is divided equally into four equal portions, each equal portion has 7.5 stator slot holes, and each phase coil of each pole has 2.5 stator slots. However, 0.5 stator slot cannot exist because of the structure of the stator, and a winding mode of a symmetric 4-pole winding cannot be presented. Thus, the present preferred embodiment makes an adjustment on a winding distribution mode. By taking a U-phase winding mode for description, a stator is divided unequally into four equal length portions, the hole number of stator slots of each equal length portion is 7 slots, 8 slots, 7 slots and 8 slots respectively. As shown in FIG. 4, there are four half-slot windings in region I, there are six half-slot windings in region II, there are four half-slot windings in region III, and there are six half-slot windings in region IV. Such a number of poles correspondingly matches corresponding windings design is able to maintain a balance of a magnetomotive force.

In the present preferred embodiment, as described above, the above plurality of sets of flux barriers are provided at an equal spacing in a circumferential direction such that torque ripples are able to be further reduced.

With the structure of the motor of the present preferred embodiment, with a non-integer slot-pole ratio design or with non-integer slot-pole ratio design matched with an asymmetric rotor design, torque ripples are able to be significantly reduced, the same output torque is able to be maintained, thus improving the overall performance of the motor.

Preferred Embodiment 2

The present preferred embodiment of the present invention provides a rotor, a plurality of poles being provided in a direction of rotation of the rotor, a plurality of sets of flux barriers being provided on the rotor, each pole corresponding to a set of flux barriers.

In one implementation of the present preferred embodiment, included angles between lines from two points on a circumferential edge of at least one flux barrier respectively to the center of the rotor and the central line are unequal in a set of flux barriers corresponding to each pole, by taking a line extending from the center of the rotor to a direction with the maximum reluctance as a central line.

In another implementation of the present preferred embodiment, in a set of flux barriers corresponding to each pole, widths of circumferential edges of at least one flux barrier in a circumferential direction are unequal by taking a line extending from the center of the rotor to a direction with the maximum reluctance as a central line.

The above two implementations can be combined to be used, which can be used as a rotor of a reluctance motor. Since in Preferred Embodiment 1, such rotor has been described in detail when describing the motor of Preferred Embodiment 1, its content is incorporated here, and a redundant description thereof is omitted here.

With the asymmetric rotor design of the present preferred embodiment, a torque ripple is able to be reduced significantly and the same output torque is able to be maintained, and the overall performance of the motor is improved.

Preferred Embodiment 3

The present preferred embodiment of the present invention provides an electrical device including the motor of Preferred Embodiment 1, further including other conventional components. The present preferred embodiment does not make limitations on structures, setting modes and functions of these conventional components, and the related arts can be referenced.

In the present preferred embodiment, based on the structure of the motor of Preferred Embodiment 1, with a non-integer slot-pole ratio design or with the non-integer slot-pole ratio design matched with an asymmetric rotor design, a torque ripple is able to be reduced significantly and the same output torque is able to be maintained, and the overall performance of the motor is improved.

In the present preferred embodiment, the electrical device may be any electrical device using a motor, for example, an automobile transmission using a motor. However, the present preferred embodiment is not limited to this, the motor of Preferred Embodiment 1 may also be used as a motor of other electrical devices, for example may be used as a motor in household appliances such as a power seat, an indoor unit of an air conditioner, an outdoor unit of an air conditioner, a water dispenser, a washing machine, a sweeper, a compressor, a blower and a blender, or may be used as a motor in various information devices and industrial devices, etc.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A motor, comprising:
   a stator including wound multiphase coils and stator slots that accommodate the multiphase coils; and
   a rotor provided at an inner side of the stator, a plurality of poles being provided in a direction of rotation, sets of flux barriers being provided on the rotor, each of the plurality of poles respectively corresponding to one of the sets of flux barriers; wherein
   a ratio between a total number of the stator slots and a product of a total number of the plurality of poles of the rotor and a phase number of the multiphase coils is a non-integer; and
   at least one of the following is true:
   total numbers of the stator slots corresponding to two adjacent ones of the plurality of poles are unequal, and total numbers of the stator slots corresponding to every two nonadjacent ones of the plurality of poles with one of the plurality of poles spaced therebetween are equal; or
   total numbers of the stator slots occupied by coils of each phase in two adjacent ones of the plurality of poles are different, and total numbers of the stator slots occupied in every two nonadjacent ones of the plurality of poles with one of the plurality of poles spaced therebetween are equal.

2. The motor according to claim 1, wherein
   in respective ones of the sets of flux barriers corresponding to each of the plurality of poles, included angles between lines from two points on a circumferential edge of at least one flux barrier respectively to a center of the rotor and a central line are unequal by taking a line extending from the center of the rotor to a direction with a maximum reluctance as a central line.

3. The motor according to claim 1, wherein
   in respective ones of the sets of flux barriers corresponding to each of the plurality of poles, widths of circumferential edges of at least one flux barrier in a circumferential direction are unequal by taking a line extending from a center of the rotor to a direction with a maximum reluctance as a central line.

4. The motor according to claim 1, wherein the total number of the stator slots is 18, 27, 30, 42, or 45.

5. The motor according to claim 1, wherein the total number of the plurality of poles is 2, 4, or 6.

6. The motor according to claim 1, wherein
   the sets of flux barriers are positioned at an equal spacing in a circumferential direction.

7. An electrical device, including the motor according to claim 1.

* * * * *